US011902276B2

(12) United States Patent
Murphy et al.

(10) Patent No.: US 11,902,276 B2
(45) Date of Patent: *Feb. 13, 2024

(54) ACCESS TO PHYSICAL RESOURCES BASED THROUGH IDENTITY PROVIDER

(71) Applicant: VMware LLC, Palo Alto, CA (US)

(72) Inventors: Gerard Murphy, Lawrenceville, GA (US); Anantha Kalyan Kumar Mulampaka, Alpharetta, GA (US); Divyankitha Mahesh Urs, Milpitas, CA (US); Yijia Zhao, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/452,155

(22) Filed: Oct. 25, 2021

(65) Prior Publication Data
US 2022/0046016 A1 Feb. 10, 2022

Related U.S. Application Data

(63) Continuation of application No. 16/677,129, filed on Nov. 7, 2019, now Pat. No. 11,196,744.

(51) Int. Cl.
H04L 9/40 (2022.01)
H04L 9/32 (2006.01)
G06K 19/06 (2006.01)
G06F 21/45 (2013.01)

(52) U.S. Cl.
CPC ......... *H04L 63/0884* (2013.01); *G06F 21/45* (2013.01); *G06K 19/06028* (2013.01); *H04L 9/3226* (2013.01); *G06F 2221/2115* (2013.01)

(58) Field of Classification Search
CPC .................................................. H04L 63/0884
See application file for complete search history.

(56) References Cited

U.S. PATENT DOCUMENTS 9,002,944 B2 4/2015 Lewis et al.
9,208,335 B2 * 12/2015 Wu ........................ H04L 9/3234
10,601,805 B2 3/2020 Lerner
10,783,546 B2 9/2020 Llewelyn
10,937,263 B1 * 3/2021 Tout ................... G07C 9/00571
(Continued)

FOREIGN PATENT DOCUMENTS

CN 106708676 A 5/2017

OTHER PUBLICATIONS

Barrett (Ron Barrett, "ProfileCopy—Move User Profiles easily in Windows", Network World, Mar. 24, 2009 (Year: 2009).
(Continued)

*Primary Examiner* — Simon P Kanaan
(74) *Attorney, Agent, or Firm* — King Intellectual Asset Management

(57) ABSTRACT

Disclosed are various approaches for providing a virtual badge credential to a user's device that is enrolled with a management service as a managed device. Upon authentication of a user's identity via an identity provider, a virtual badge credential can be provided to an application on the client device. The virtual badge credential can be presented by the client device to access control readers to gain access to physical resources, such as doors and buildings, that are secured by the access control readers.

20 Claims, 6 Drawing Sheets

(56) References Cited

U.S. PATENT DOCUMENTS

| | | |
|---|---|---|
| 2003/0110381 A1 | 6/2003 | Aoshima et al. |
| 2006/0071066 A1 | 4/2006 | Vanzini et al. |
| 2010/0122334 A1* | 5/2010 | Stanzione ............. G06F 16/182 |
| | | 713/150 |
| 2011/0093933 A1 | 4/2011 | Lindholm et al. |
| 2013/0297416 A1 | 11/2013 | Dipaola et al. |
| 2017/0337757 A1 | 11/2017 | Bullappa |
| 2019/0132303 A1 | 5/2019 | Kurian |

OTHER PUBLICATIONS

Stallings (William Stallings, "Cryptography and Network Security: Principles and Practices (5th Edition)", ISBN-10: 0136097049, Jan. 2010) (Year: 2010).

* cited by examiner

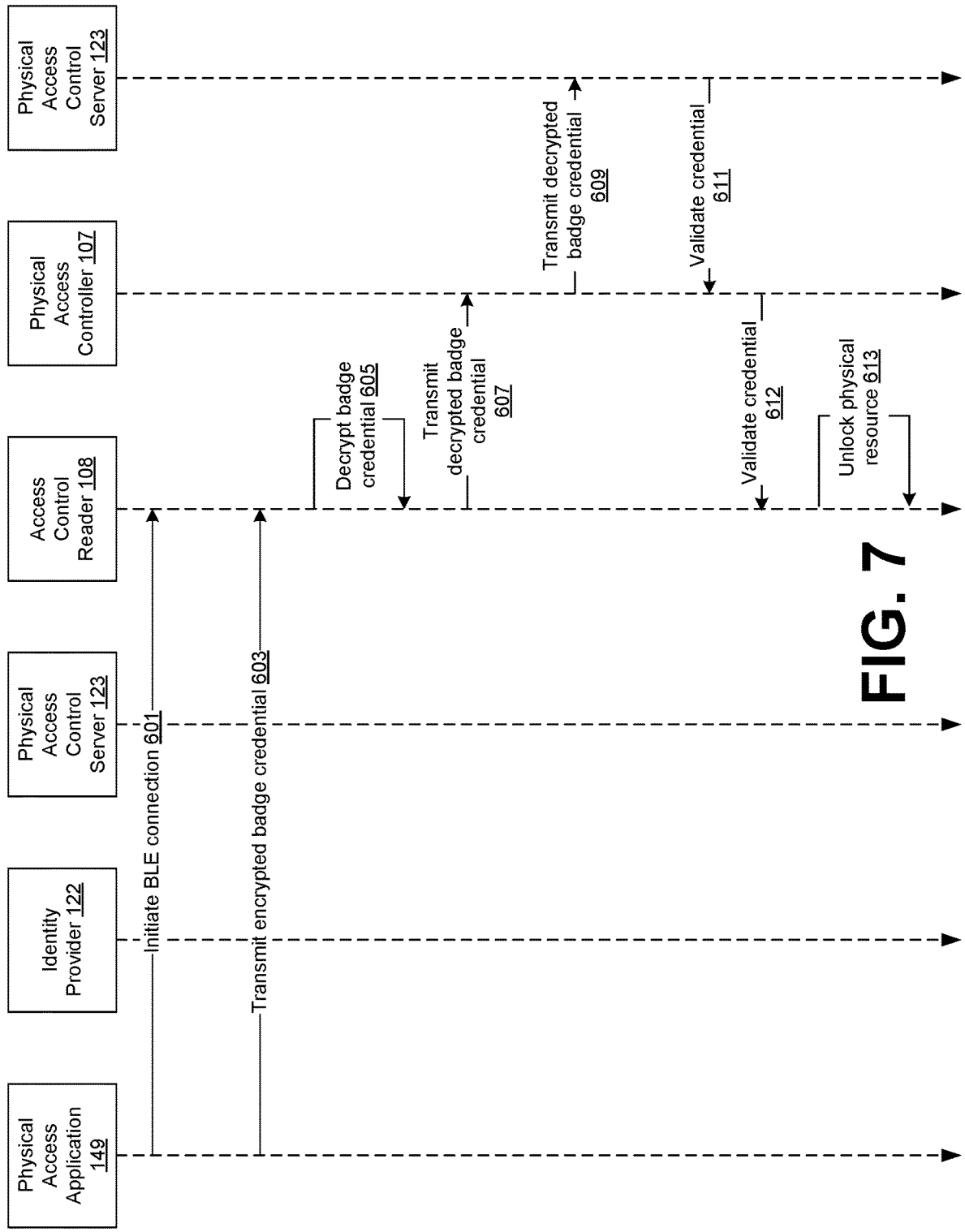

ACCESS TO PHYSICAL RESOURCES BASED THROUGH IDENTITY PROVIDER

CROSS-REFERENCE TO RELATED APPLICATIONS

This application is a continuation of and claims the benefit of U.S. patent application Ser. No. 16/677,129, entitled "ACCESS TO PHYSICAL RESOURCES BASED THROUGH IDENTITY PROVIDER," and filed Nov. 7, 2019, which is hereby incorporated by reference in its entirety

BACKGROUND

In today's environment, smartphones and other devices are becoming more and more ubiquitous and more essential to users. With the advent of mobile payment solutions, many users have even eliminated carrying a physical wallet and carry only a smartphone instead. Alternatively, some users carry a smartphone with an integrated physical wallet to carry physical cards, such as credit cards, identification badges, and proximity cards that are used to access physical resources, such as buildings and rooms in an office environment. Accordingly, user might desire a solution for accessing physical resources and having a verifiable electronic identification badge that can be integrated into a device that can be carried or worn.

In a legacy environment, to access rooms, buildings or other physical resources, users can be expected to present an identification badge or a proximity card to an access reader, which communicates with the badge or card using radio-frequency identification (RFID) technology or other localized wireless communication standards or proprietary protocols. However, smartphones and wearable devices are also equipped with personal area networking and near-field communications capabilities, which are often unutilized to authenticate a user's access to physical resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 7 is a flowchart that illustrates functionality according to examples of the disclosure.

DETAILED DESCRIPTION

Disclosed are examples of a system that facilitates access to physical resources using a mobile or wearable client device. The client device can obtain an electronic or virtual badge credential after verifying the identity of a user, and an application on the client device can utilize the virtual badge credential to authenticate the user's access to physical resources. An application on the client device can also act as virtual badge that can display a photo of the user or an identifier that can be used to verify the user's identity by security personnel using another device that captures the identifier.

In many office environments, access control readers can secure access doors to rooms or buildings. A user in the environment presents a credential, which is often a proximity card with which the access control reader communicates using radio frequency identification (RFID) to verify the credential, and the access control reader unlock a door or provide access a physical resource. To provide access, the access control reader can release a lock that secures the door so that the user can open the door or access another physical resource that is secured by the lock. Additionally, users in an office environment might also be required to carry a badge that can be used by security other personnel to verify the identify of the user. Often, a photograph of the user is printed on a physical badge, which often doubles as an access card, that can be shown to others by the user.

Examples of this disclosure can allow the user to utilize an application on a client device 106 that can act as a credential to access physical resources secured by access control readers. Examples of this disclosure can allow the user to utilize an application on a client device 106 that can also act as a badge that security personnel can verify to view the user's photo or another identifier, such as a quick response (QR) code. The identifier can be used by security personnel to access a photo of the user to verify the user's identity. In some cases, a photo of the user can be displayed on a display device associated with the device that captures the identifier or another display that is connected to an access gate or access door.

Figure 1:
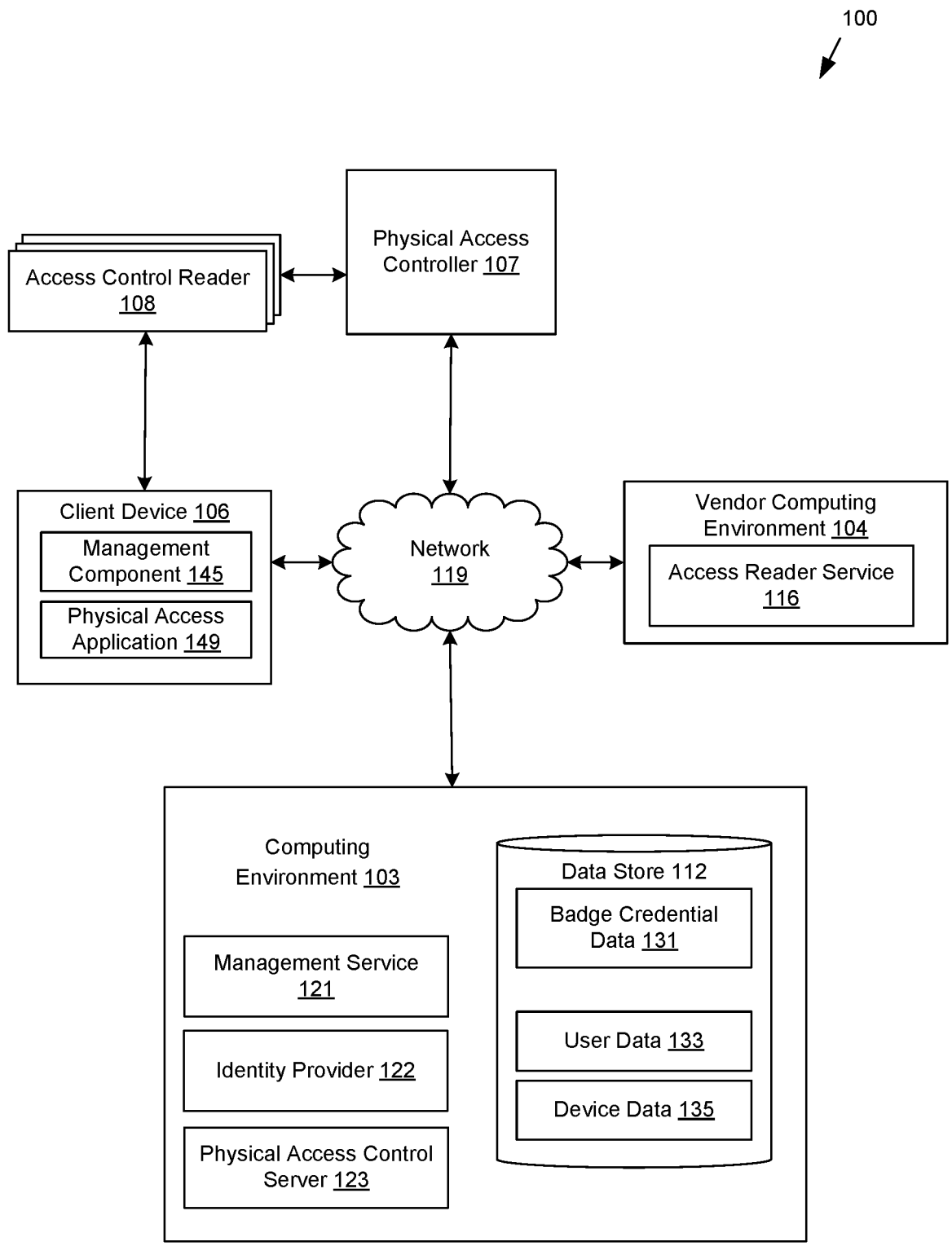
FIG. 1 is a schematic block diagram depicting an example implementation according to various examples of the disclosure.

FIG. 1 illustrates an example of a networked environment 100 according to examples of the disclosure. In the depicted network environment 100, a computing environment 103 is in communication with at least one client device 106, a vendor computing environment 104, and one or more physical access controllers 107, over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The computing environment 103 and vendor computing environment 104 can be a computing environment that is operated by an enterprise, such as a business or other organization. The computing environment 103 and vendor computing environment 104 include a computing device, such as a server computer, that provides computing capabilities. Alternatively, the computing environment 103 and vendor computing environment 104 can employ multiple computing devices that are arranged in one or more server banks or computer banks. In one example, the computing devices can be located in a single installation. In another example, the computing devices for the computing environment 103 and vendor computing environment 104 can be distributed among multiple different geographical locations. In one case, the computing environment 103 and vendor computing environment 104 include multiple computing devices that together can form a hosted computing resource or a grid computing resource. Additionally, the computing environment 103 and vendor computing environment 104 can operate as an elastic computing resource where the allotted capacity of computing-related resources, such as processing resources, network resources, and storage resources, can vary over time. In other examples, the computing environment 103 and vendor computing environment 104 can include or be operated as one or more virtualized computer instances that can be executed to perform the functionality that is described herein.

Various applications or other functionality can be executed in the computing environment 103. Also, various data can be stored in a data store 112 that can be accessible to the computing environment 103. The data store 112 can be representative of a plurality of data stores 112. The data stored in the data store 112 can be associated with the operation of the various applications or functional entities described below.

The components executed on the computing environment 103 can include a management service 121, an identity provider 122, a physical access control server 123, and other applications, services, processes, systems, engines, or functionality not discussed in detail herein.

In some implementations or in certain cases, devices associated with users in a corporate environment can be managed devices that are enrolled with a management service 121. The management service 121 can be executed by the computing environment 103 in an on-premises implementation or in another computing environment that is separate from the computing environment 103. The management service 121 can also be provided with access to information about users, physical resources, physical access credentials.

The management service 121 can monitor and oversee the operation of one or more client devices 106 by administrators. In some examples, the management service 121 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 121. The management service 121 can initiate installation of applications as managed applications. The management service 121 can also initiate installation of configuration profiles that can be accessed by certain applications installed on a client device 106.

The management service 121 can include a management console that can allow administrators to manage client devices 106 that are enrolled with the management service 121. User interfaces can allow an administrator to define policies for a user account or client devices 106 associated with an enterprise environment. The user interfaces can also include, for example, presentations of statistics or other information regarding the client devices 106 that can be managed by the management service 121.

The identity provider 122 can provide single sign-on or identity management features for users of an enterprise. To access one or more applications that are provided by an enterprise to its users, the user can authenticate his or her access to those applications through the identity provider 122. The identity provider 122 can consult stored authentication data to determine whether a user's identity has been authenticated and provide the user's device one or more authentication tokens or identity assertions, which can in turn be provided to other applications or services to authenticate the user's identity.

The identity provider 122 can carry out federated user authentication on behalf of an enterprise to allow the user to access various applications provided by the enterprise to its users. For example, the identity provider 122 can implement OAuth, SAML, or similar protocols that allow for federated user authorization or authentication. The identity provider 122 can verify a user's credentials or identity and provide an authentication token, such as a SAML assertion, that can be provided to an application service by an application on a client device 106 to authenticate the user's access to a service provided by the enterprise. The identity provider 122 can issue the authentication token to a client device 106, and the authentication token can be provided to the physical access control server 123, which can obtain a badge credential on behalf of the user, which can in turn be used to access physical resources. In some embodiments, the identity provider 122 can be implemented in a separate computing environment or by a separate entity than the management service 121.

The Physical access control server 123 can facilitate authentication of badge credentials that are presented to access control readers 108. The Physical access control server 123 can receive requests to generate badge credentials from an administrator or a client device 106, cause a badge credential to be created on behalf of a user, and store the badge credential in the data store 112. The Physical access control server 123 can also receive a request to authenticate a badge credential on behalf of an access control reader 108. The request can be received from the physical access controller 107, which can be connected to multiple access control readers 108 that may not have access to the network 119.

The data stored in the data store 112 can include a badge credential data 131, user data 133, device data 135 and potentially other information to support the execution of the management service 121, identity provider 122, or Physical access control server 123. The user data 133 and device data 135 can include the various objects and data structures that are associated with an enterprise directory of user accounts and devices. Objects within the user data 133 and device data 135 can be organized into data structures, such as forests, trees, domains, organizational units, groups, partitions, or other organizational structures depending upon a directory service that might be utilized by the enterprise. Additionally, the directory can be replicated across more than one data store 112 for redundancy purposes. The inner-workings and specific structure of the directory are not shown or discussed herein, as they are not necessary for an understanding of examples of this disclosure. Additionally, the directory of users and devices might be separate from user data that is maintained or utilized by the management service 121. However, the exact configuration of user data and device data is not necessary for a full understanding of examples of the disclosure.

User data 133 can include user identifiers, authentication credentials, other identifying information about users, and information about devices to which users are assigned, such as identifying information about a user's smartphone, wearable devices, or other computing devices that are assigned to or used by the user. The user data 133 can also include session data corresponding to various sessions established by the user. For example, if the user signs into enterprise resources using a first device, a session can be established that corresponds to that first device. If the user then logs in from a second device, another session can be established.

Device data 135 can include information about user devices that are being used by the users within the enterprise. Device data 135 can include device identifiers, security certificates, configuration profiles, and other information about devices. Device data 135 can also include information about physical resources that are in the enterprise that might be secured by access control readers 108. In the context of this disclosure, a physical resource can be associated with an electronic record in a directory. A physical resource can correspond to a building, a door, a meeting room, a conference facility, or another physical resource to which an access control reader 108 can secure access. The electronic record associated with the physical resource can specify metadata describing the physical resource. For example, a meeting room name, location, resources within a meeting room, and other metadata can be stored in the electronic record.

Badge credential data 131 can represent data that corresponds to badge credentials that are issued to users for the purpose of accessing physical resources that are secured by access control readers 108, such as rooms or buildings. The badge credential data 131 can identify whether a particular credential has access to a particular resource secured by a particular access control reader 108. Accordingly, the badge credential data 131 can be organized by groups of users and groups of access control readers 108. The badge credential data 131 can be stored in encrypted form and/or indexed in various ways. The Physical access control server 123 can act as the portal through which the badge credential data 131 is manipulated by an administrator or queried by access control readers 108 and physical access controllers 107.

Device records in the device data 135 can correspond to client devices 106 that are enrolled as managed devices with the management service 121. A device record can include various security settings selected for enforcement on a client device 106 that is enrolled with the management service 121. Accordingly, a device record can include a device identifier associated with a device, such as the client device 106, one or more device certificates, a compliance status, and other data. In some examples, a device record can also identify a user associated with a particular client device 106. The compliance status can indicate whether a particular client device 106 is in compliance with one or more compliance rules.

More specifically, the device record can include one or more of: data describing the identity, type and components of the client device 106; data describing the state of the client device 106; data describing organizational groups to which the client device 106 belongs; data describing compliance rules with which the client device 106 must comply; data describing management policies that specify if, when, and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 121), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various I/O component types such as camera, touchscreen, keyboard, mouse, printer). More particularly, a device record associated with a client device 106 comprising a network connection television can specify that the client device 106 is a device type of phone, that the client device 106 has an active connection to the Internet, and that the client device 106 has a camera enabled.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 121, whether the client device 106 is in a state of compliance with any applicable compliance rules, and whether any remedial actions have been (or are to be) taken as a result of a noncompliance with any applicable compliance rules. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Further, the device record can include data describing a command queue associated with the client device 106. For example, the management service 121 can maintain a command queue of commands that are designated for execution against the client device 106. As described herein, a client device 106 can be provisioned by the management service 121 by causing resources to be installed or stored on the client device 106. To implement such process, the management service 121 can store a command related to provisioning in the command queue. Additionally, the management service 121 can store a command related to a remedial action associated with a compliance rule in the command queue, in the event that it is determined that a rule condition associated with the compliance rule has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Finally, data describing compliance rules with which the client device 106 must comply can, for instance, specify one or more security policies to which the client device 106 must adhere, a compliance status of the client device 106, and one or more remedial actions that should be performed in the event that an associated rule condition occurs, as described later herein. In some embodiments, the data describing compliance rules and the data describing management policies are obtained from an organizational record associated with an organizational group to which the client device 106 is a member (i.e., the compliance rules associated with the organizational group are reflected in the device record of the member client device 106).

A compliance status of a client device 106 represents whether the device is in compliance with one or more compliance rules. Various compliance rules can be enforced on the client device 106 by the management service 121. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the computing environment 103. Furthermore, a compliance rule in another example can be based upon the time and date matching specified values.

A compliance rule can specify that a client device 106 is required to be powered off or be in a low power "sleep" state during a specified time period. Another compliance rule can specify that a client device 106 is required to be powered on or be in a normal operation "awake" state during a specified time period. As another example, a compliance rule can specify that a client device 106 is prohibited from rendering content that has been designated as confidential. A compliance rule can also specify whether a camera associated with the client device 106 must be enabled or disabled. The compliance rule can also specify certain times of the day, week, or year in which certain hardware or software features are permitted to be enabled or disabled.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to authenticate a user using a password or personal identification number (PIN) in order to unlock the client device 106.

A compliance rule can also require that the client device 106 has device encryption enabled, where data stored on the device is stored in an encrypted form. The data can be encrypted by a device certificate. A compliance rule can also require that the client device 106 be enrolled with the management service 121 as a managed device. Another compliance rule can specify that the user is required to accept the terms of service that are presented by the management component 145 on the client device 106. As another example, a compliance rule can specify that the management component 145 is required to periodically communicate or "check-in" with the management service 121 to report on its status. If a threshold amount of time has elapsed since the previous check-in of the client device 106, the client device 106 can be considered to have violated this compliance rule.

Another compliance rule can specify that a client device 106 run one of a specified variant or version of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

A compliance rule can also identify a list of required applications that must be installed on the client device 106 or a list of forbidden applications that cannot be installed on the client device 106. The management component 145 can remove a forbidden application or install a missing required application on the client device 106 in response to detecting a violation of such a compliance rule. A compliance rule can also require the presence of a mobile device management (MDM) profile, an MDM storage area, an application profile, and/or a configuration profile. The management component 145 can obtain and store missing required data or containers on the client device 106 in response to detecting a violation of such a compliance rule.

Therefore, the compliance status indicates whether and to what extent a particular client device 106 is compliant with compliance rules assigned to the client device 106 by the management service 121. The compliance status can be determined by a management component 145 on the client device 106 that analyzes the status of the client device 106 and reports compliance to the management service 121. In other examples, the compliance status can be determined by the management service 121 based upon state information describing the client device 106, which can be reported by the management component 145. The compliance status can also include the state of various hardware or software features of the client device 106 without respect to whether the status of the features are determined by a compliance rule.

User data 133 can also contain information about users who are associated with client devices 106 that are enrolled with the management service 121. User data 133 can include profile information about a user, authentication information about a user, applications that are installed on client devices 106 associated with the user, and other user information. For example, user data 133 can include information about client devices 106 that are associated with a user account of the user, enterprise resources to which a particular user has access, such as email, calendar data, documents, media, applications, network sites, or other resources. The user data 133 can also identify one or more user groups of which a particular user is a member, which can in turn define the access rights of the user to one or more enterprise resources as well as identify which applications should be deployed to a client device 106 associated with the user. To this end, the user data 133 can further identify one or more device identifiers that can uniquely identify client devices 106 that are associated with a user account of the user. In some implementations, some of the user data 133 can be stored by or in locations specified by the directory service rather than in the data store 112 associated with the management service 121.

An access control reader 108 represents an access control device that can capture an identifier or credential from a proximity card, smart card, contactless card, or other type of badge or credential. The access control reader 108 can operate an actuator that controls a physical or electronic lock securing access to a physical resource. The access control reader 108 can capture a credential from a badge, proximity card, RFID device, or other device that communicates using a standard supported by the access control reader 108. Once captured, the access control reader 108 can determine whether the credential embedded in the device supplying the credential should be granted access to a physical resource secured by the access control reader 108. If access should be granted, the access control reader 108 can cause a door to be unlocked, an elevator button to be enabled, an entry gate to be opened, or perform an action to cause access to a physical resource to be granted. If access should not be granted, the access control reader 108 can display or otherwise signal an error or that access is not granted to the physical resource. If access should not be granted, the access control reader 108 can also simply do nothing.

The access control reader 108 can communicate with badges, proximity cards, or other devices providing credentials over RFID, Bluetooth, Bluetooth low energy, smartcard reader interfaces or other wireless or wired communication protocols. The access control reader 108 can be flashed by the manufacturer with a decryption key with which credentials can be decrypted. The decryption key can be a private key that corresponds to a public key with which a credential is encrypted by or on behalf of the device providing a credential to the access control reader 108.

In some scenarios, access control readers 108 might not be equipped with the ability to communicate with the network 119 to ease deployment or reduce the cost and complexity of deploying the device in a large scale enterprise. Accordingly, a physical access controller 107 can be provided that can communicate with the network 119 on behalf of access control readers 108. The physical access controller 107 can be a computing device that is in local communication with multiple access control readers 108 in a deployment and that is also in communication with the Physical access control server 123 and potentially the vendor computing environment 104 over the network 119. When the access control reader 108 is presented with a credential, the access control reader 108 can provide the credential to the physical access controller 107 for a decision as to whether to grant access to the physical resource.

The physical access controller 107 can query the physical access control server 123 with the presented credential and information about the access control reader 108, and the Physical access control server 123 can provide an indication as to whether access should be granted. The physical access controller 107 can also cache badge credential data 131 corresponding to credentials that are provided to the access control reader 108. By caching badge credential data 131, not every request presented by the access control reader 108 requires a query to the Physical access control server 123. The Physical access control server 123 can also be instrumented to notify the physical access controller 107 in the event of a revocation or a change in the permissions for a particular credential.

The vendor computing environment 104 represents one or more computing devices operated by or on behalf of a manufacturer of the access control readers 108 that can be deployed in an enterprise environment. The access reader service 116 represents a network accessible service that provides API's through which a customer of the vendor can request and obtain virtual badge credentials that can be used by the enterprise to issue to its users. In one scenario, the enterprise can obtain physical credentials, such as a set of proximity cards, that can be issued to its users. The physical credentials can have an encrypted credential embedded therein. The encrypted credential can be encrypted using a public key that corresponds to a private key to which the access control reader 108 or physical access controller 107 has access.

Additionally, the enterprise can obtain virtual badge credentials from the access reader service 116 using an API provided by the manufacturer, seller, or distributor of the physical credentials or the access control readers 108, for example. The virtual badge credentials can be utilized from a physical access application 149 according to examples of this disclosure. The physical access application 149 can store a virtual badge credential and allow a user to use a client device 106 as a substitute for a physical credential such as a proximity card or badge incorporating the credential. Virtual badge credentials and the data within physical credentials can be stored as badge credential data 131, and the Physical access control server 123 can operate as the enterprise's portal to the badge credential data 131.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 121 as a managed device of the enterprise. In some implementations, the client device 106 can be an unmanaged device that is not enrolled with a management service 121.

In one implementation, the client device 106 can execute a management component 145 that can communicate with the management service 121 to facilitate management of the client device 106. The management component 145 can communicate with the management service 121 to enforce management policies and compliance rules on the client device 106. For example, the management component 145 can enforce data security requirements, install, remove or update security certificates, or write, modify or delete certain data from the client device 106. The management component 145 can also monitor the client device 106, generate state information describing the client device 106, and provide the management service 121 with such state information. For example, the state information can include the network activity of the client device 106, the location of the client device 106, whether enforce password or personal identification number (PIN) authentication is enforced, and/or whether other compliance rules are being complied with by the client device 106. In one example, the state information can be generated by the management component 145 by receiving compliance rules from the management service 121 over the network 119, comparing the state of the client device 106 to the compliance rules, and determining whether the client device 106 fails to satisfy the compliance rules.

To carry out local management of a client device 106, the management component 145 can be installed and executed with elevated or administrative privileges on the client device 106. In some scenarios, the operating system of the client device 106 can allow a particular application or package to be identified as a device owner or a device administrator, which can in turn configure the client device 106 using such privileges.

The client device 106 can also execute a physical access application 149. The physical access application 149 can obtain a virtual badge credential on behalf of a user and store the virtual badge credential on the client device 106. In one implementation, a requirement to obtain the virtual badge credential would be user authentication with the identity provider 122. Once obtained, the virtual badge credential can be presented by the physical access application 149 to an access control reader 108 to access physical resources secured by the access control reader 108. The virtual badge credential can be presented to the access control reader 108 using Bluetooth low energy, near-field communication (NFC) or another local or personal area network interface supported by the client device 106 and the access control reader 108.

The physical access application 149 can also allow a user to generate or display a virtual badge on a display of the client device 106. The virtual badge can incorporate an employee identifier embedded in a QR code or another encoding method that can be displayed or obtained from the client device 106. The virtual badge can also include photo of a user that can be verified by security personnel in a facility. In one scenario, when the user taps his device on an access control reader 108 or approaches the access control reader 108, the physical access application 149 can provide data associated with the virtual badge to the access control reader 108. The access control reader 108 can then display an employee identifier or photo of the employee on a display that is near or in communication with the access control reader 108. The virtual badge data can be stored as badge credential data 131 in the data store 112 and capture a physical identifier corresponding to a physical resource. The virtual badge can be provided by the Physical access control server 123 or another service to the physical access application 149.

Figure 2:
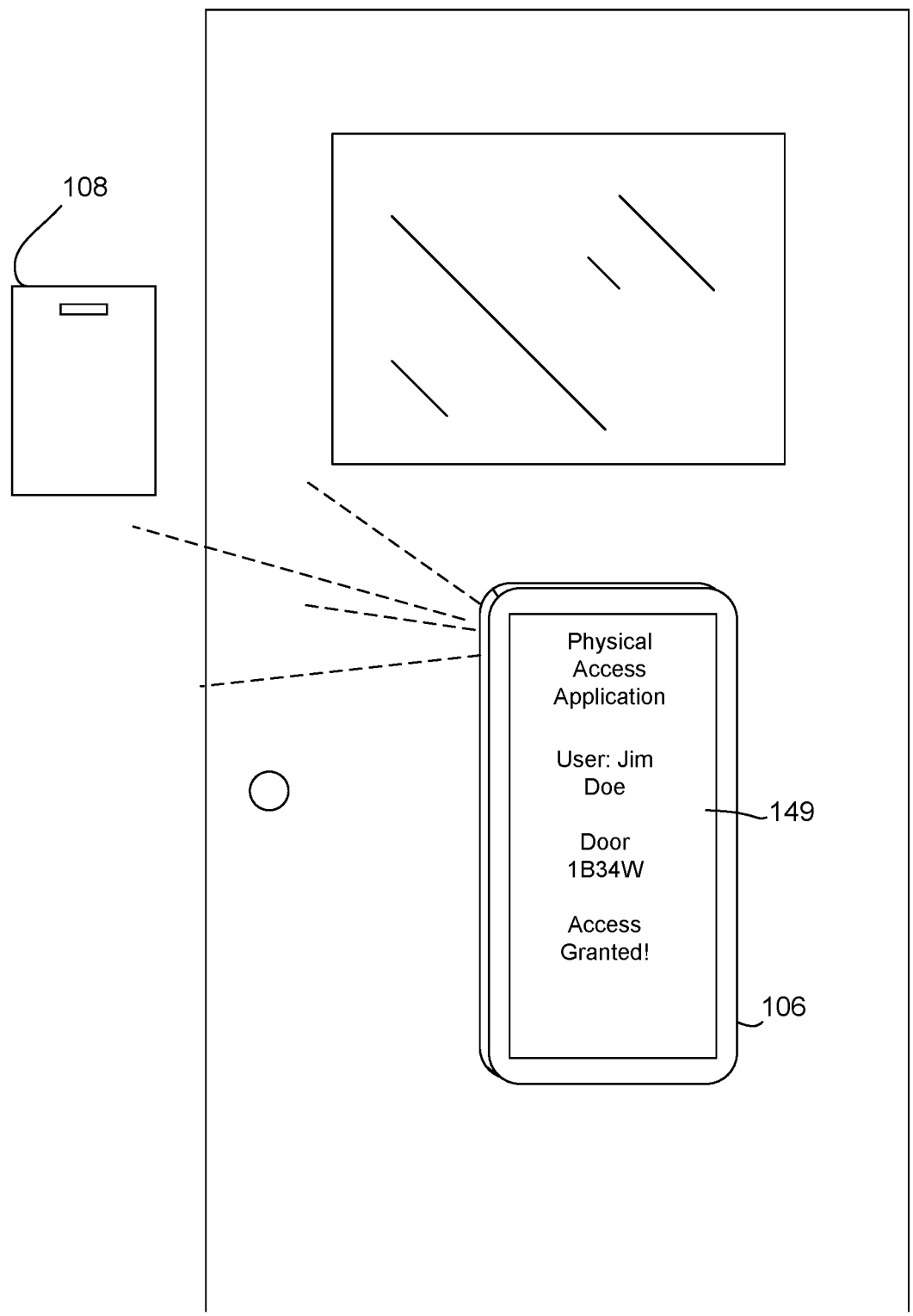
FIG. 2 is an example of the physical access application executed by a client device according to examples of the disclosure.

Referring next to FIG. 2, shown is an example of a physical access application 149 executed by a client device 106 that can communicate with an access control reader 108 that secures access to a physical resource. In the example of FIG. 2, the physical resource is a door that is secured by a lock mechanism that the access control reader 108 is configured to actuate.

Accordingly, to unlock the door, a user can approach the access control reader 108 with a client device 106 running the physical access application 149 that has obtained a virtual badge credential on behalf of the user. The physical access application 149 can be configured to automatically launch when in the proximity of the access control reader 108 through a Bluetooth or NFC session. The communication session with the access control can be initiated by the operating system of the client device 106 once the client device 106 is within a configurable range of the access control reader 108. The configurable range can be based on a signal strength threshold that can be adjusted by the user or by an administrator. The communication session with the access control can also be initiated by the access control reader 108 rather than by the client device 106.

Once a communication session between the client device 106 and the access control reader 108 is established, the physical access application 149 can provide a virtual badge credential to the access control reader 108. The virtual badge credential can be encrypted using a public key that corresponds to a private key held by the access control reader 108 to decrypt credentials. The access control reader 108 can decrypt the virtual badge credential and query a physical access controller 107 with the decrypted credential. The physical access controller 107 can respond to the access control reader 108 with an indication of whether the credential is entitled to access the physical resource secured by the access control reader 108. If the credential is entitled, the access control reader 108 can cause the door to be unlocked. If the credential is not entitled, the access control reader 108 can cause the door to remain locked or do nothing.

Figure 3:
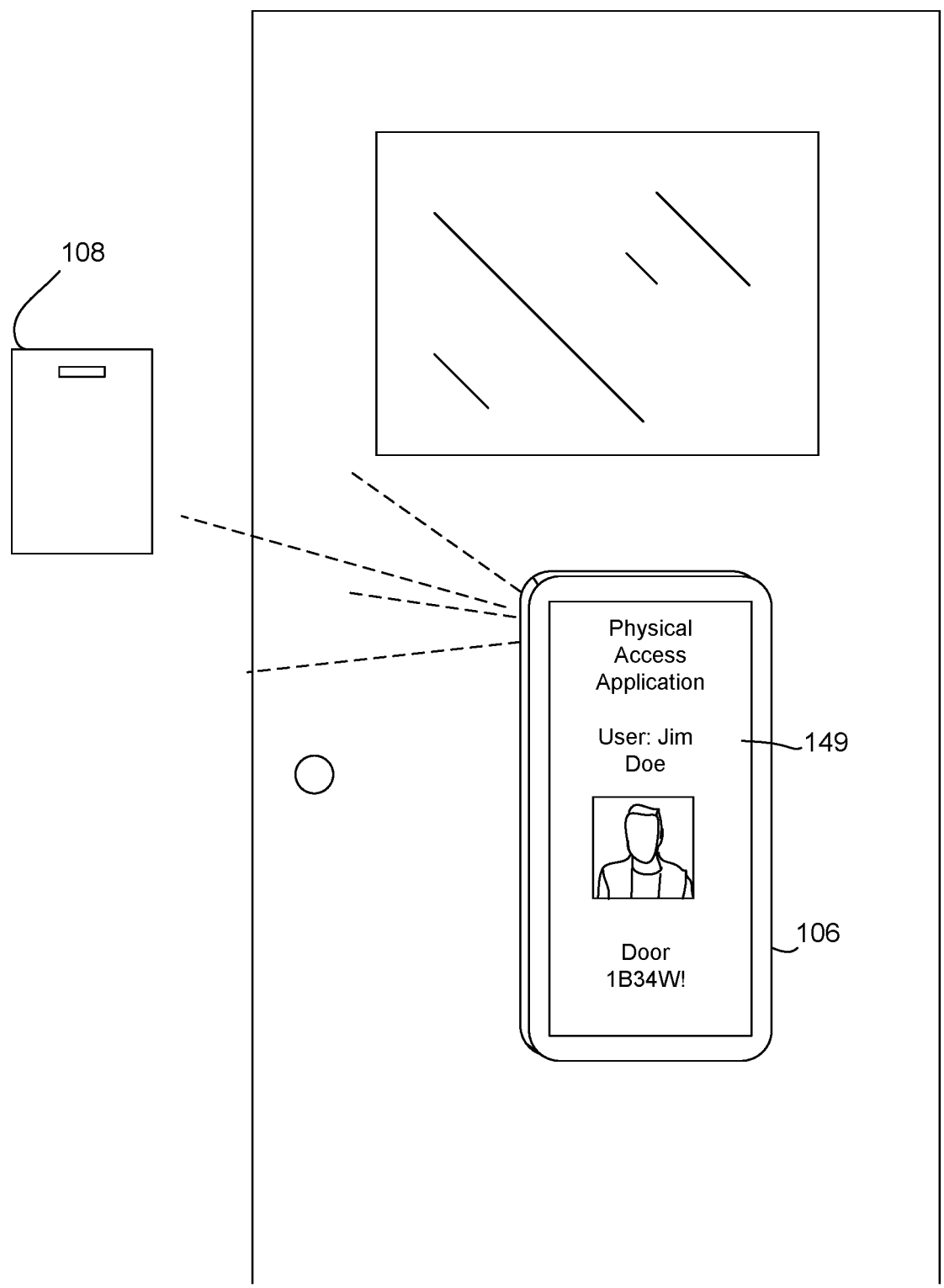
FIG. 3 is an example of the physical access application executed by a client device according to examples of the disclosure.

Referring next to FIG. 3, shown is an example of the physical access application 149 executed by a client device 106 in an alternative scenario. In the example of FIG. 3, the physical access application 149 can again communicate with an access control reader 108 that secures access to a physical resource. In the example of FIG. 3, the physical resource is also a door that is secured by a lock mechanism that the access control reader 108 is configured to actuate.

In contrast, to the example of FIG. 2, the physical access application 149 can display a photo of a user corresponding to the virtual badge credential presented to the access control reader 108. In this example, the physical access application 149, can receive an indication that the client device 106 has presented a valid credential to access the door secured by the access control reader 108 and display a photo that corresponds to the virtual badge credential. The photo can be obtained from the badge credential data 131. In this example, the photo can be shown to security personnel, who can verify the identity of a user to which the virtual badge credential was issued. In this way, if a client device 106 is stolen or being used by another user, security personnel may be able to intervene and deny access to the physical resource secured by the access control reader 108.

Figure 4:
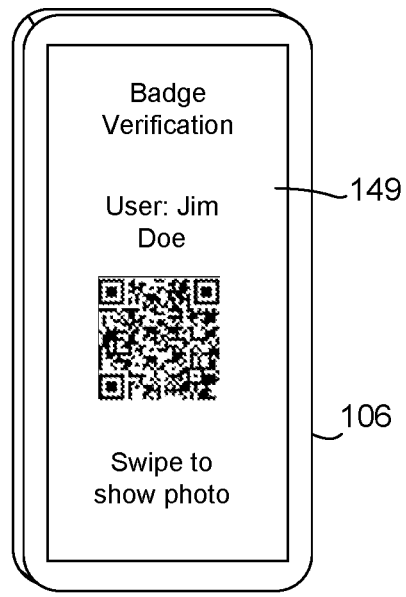
FIG. 4 is an example of the physical access application executed by a client device according to examples of the disclosure.

Referring next to FIG. 4, shown is an example of the physical access application 149 executed by a client device 106 in another alternative scenario. In the example of FIG. 4, the physical access application 149 is being utilized as a virtual badge that can display a virtual badge on a display of the client device. The virtual badge credential can be obtained from the Physical access control server 123 upon verifying the identity of the user by the identity provider 122. The virtual badge credential can include a photo of the user as well as a user identifier of the user can be verified by security personnel using another device.

As shown in FIG. 4, the physical access application 149 can display a user or employee identifier that is embedded in a QR code. The employee identifier can be simply displayed in alphanumeric form on the display or embedded in another type of barcode or visual encoding scheme. The employee identifier can also be provided to another device for verification through NFC, Bluetooth, a local or personal area networking interface. The physical access application 149 can allow the user to display an employee identifier as well as a photo of the user, as is shown in FIG. 5.

Figure 5:
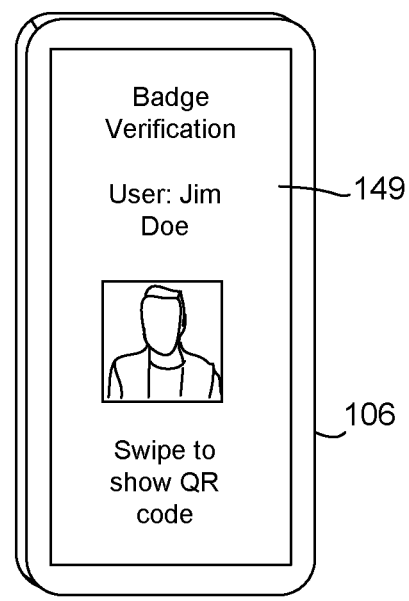
FIG. 5 is an example of the physical access application executed by a client device according to examples of the disclosure.

As shown in FIG. 5, the physical access application 149 can display a photo of the user on the display of the client device 106. The photo can be obtained as a part of the virtual badge credential from the Physical access control server 123 upon verifying the identity of the user by the identity provider 122. The photo can be shown on the display of the client device or on another display associated with an access control reader 108 or one that is in proximity to the client device 106. The photo identifier can also be provided to another device for verification through NFC, Bluetooth, a local or personal area networking interface.

Figure 6:
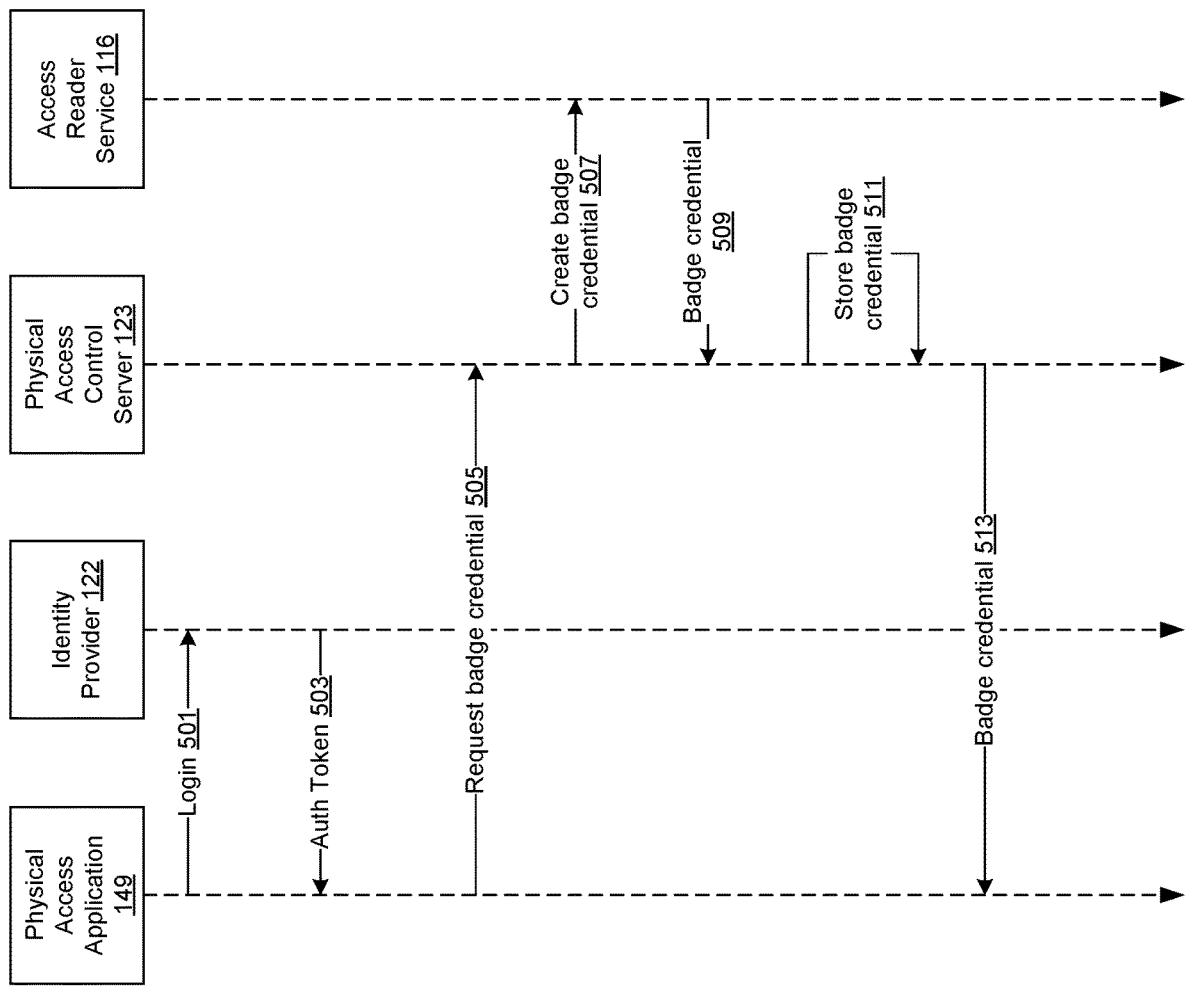
FIG. 6 is a flowchart that illustrates functionality according to examples of the disclosure.

Referring to FIG. 6, shown is a sequence diagram that provides one example of how the physical access application 149 can obtain a virtual badge credential from the Physical access control server 123 on behalf of a user. The virtual badge credential, once obtained by the physical access application 149, can be utilized to gain access to physical resources secured by access control readers 108. In one implementation, the physical access application 149 can be implemented using a vendor API associated with a manufacturer of an access control reader 108 to incorporate the functionality of session negotiation and credential presentment to access control readers 108.

The sequence diagram of FIG. 6 assumes that a client device 106 executing the physical access application 149 has not yet authenticated with the identity provider 122. Accordingly, at step 501, upon launching of the physical access application 149, the physical access application 149 can determine that the user has not yet authenticated and challenge the user for his or her credentials. The authentication credentials, such as a username/password pair, can be provided to the identity provider 122 at step 501. In some scenarios, the login process can require the user to perform a multi-factor authentication process involving a secondary or biometric authentication factor. It some cases, when a single sign-on application has established a session with the identity provider 122, the physical access application 149 can rely upon a previous authentication of the user instead of challenging the user for his or her authentication credentials.

At step 503, upon verifying the authentication credentials as well as secondary authentication factors, if required, the identity provider 122 can provide an authentication token to the physical access application 149 at step 503. The authentication token can include a security assertion markup language (SAML) identity assertion that the physical access application 149 can later provide to the Physical access control server 123 to prove the identity of the user account for which it is requesting a virtual badge credential.

At step 505, the physical access application 149 can request a virtual badge credential from the Physical access control server 123. The request can include the authentication token obtained from the identity provider at step 503. The request can also include a device identifier corresponding to the client device 106 on which the physical access application 149 is being executed. The request can further include a user identifier along with the authentication token. Upon receiving the request, the Physical access control server 123 can verify the identity of the user account corresponding to the authentication token. In some implementations, the Physical access control server 123 can also verify compliance of the client device 106 with one or more compliance rules enforced by the management service 121 as a condition of issuing a virtual badge credential to the client device 106.

After authenticating the authentication token corresponding to a user account, the Physical access control server 123 can request the access reader service 116 to generate a virtual badge credential on behalf of the user account at step 507. The request can include user identifying information, such as a username, email address, or other information needed to generate the virtual badge credential. In some implementations, the manufacturer provides the access reader service 116 to generate virtual badge credentials through API's provided by the access reader service 116.

At step 509, the virtual badge credential can be provided to the Physical access control server 123. At step 511, the Physical access control server 123 can store the virtual badge credential in the data store 112 as badge credential data 131. At step 513, the virtual badge credential can be provided to the physical access application 149. The virtual badge credential can be stored on the client device 106 in a storage area that is accessible by the physical access application 149. In some examples, the virtual badge credential can be stored in encrypted format or in a storage area that is inaccessible to other applications on the client device 106. Thereafter, the process proceeds to completion.

Referring to FIG. 7, shown is a sequence diagram that provides one example of how the physical access application 149 can utilize a virtual badge credential obtained from the Physical access control server 123 by way of the access reader service 116. The virtual badge credential is utilized to access a physical resource by an access control reader 108. In one implementation, the physical access application 149 can be implemented using a vendor API associated with a manufacturer of an access control reader 108 to incorporate the functionality of credential presentment to access control readers 108.

The sequence diagram of FIG. 7 assumes that a client device 106 executing the physical access application 149 has authenticated with the identity provider 122 and obtained a virtual badge credential. For example, according to the process shown in FIG. 6, a user can obtain a virtual badge credential using the physical access application 149 for presentment to access control readers 108 in the enterprise.

Accordingly, at step 601, the physical access application 149 can initiate a connection to a nearby access control reader 108. The connection can be initiated using a Bluetooth low energy connection or another local or personal area networking connection interface. For example, the connection can also be established using NFC. In some cases, a communication session between the physical access application 149 and the access control reader can be established once the signal strength of a BLE connection between the two reaches a minimum threshold. This threshold can be configured by a user or an IT administrator.

At step 603, once the connection or session between the client device 106 and the access control reader 108 is established at a minimum threshold signal strength level, the physical access application 149 can provide the virtual badge credential to the access control reader 108. In one implementation, the physical access application 149 can provide an encrypted version of the virtual badge credential that is encrypted using a public key corresponding to a private key held by the access control reader 108 or the physical access controller 107.

At step 605, the access control reader 108 can decrypt the encrypted virtual badge credential using a private key corresponding to the public key with which the virtual badge credential was encrypted. In some implementations, the physical access controller 107 or Physical access control server 123 can perform the decryption step.

At step 607, the access control reader 108 can provide the decrypted virtual badge credential to the physical access controller 107 along with a request to provide an indication as to whether the virtual badge credential is entitled to access the physical resource secured by the access control reader 108. The access control reader 108 can provide the virtual badge credential to the physical access controller 107 because it may not have the ability to access the network 119. If the access control reader 108 has the capability to access the network 119, it can communicate directly with the Physical access control server 123 rather than through the physical access controller 107.

At step 609, the physical access controller 107 can provide the decrypted virtual badge credential to the Physical access control server 123 and request an indication as to whether the virtual badge credential is entitled to access the physical resource secured by the access control reader 108. The request can include an identifier that identifies the access control reader 108.

The Physical access control server 123 can determine whether the virtual badge credential is entitled to access the physical resource secured by the access control reader 108. The Physical access control server 123 can make this determination by determining from the badge credential data 131 whether the virtual badge credential is authorized to cause the access control reader 108 to grant access to the physical resource. If the virtual badge credential is authorized, the Physical access control server 123 can provide an indication to the physical access controller 107 at step 611, which can be then provided to the access control reader 108 from the physical access controller 107 at step 612. Upon receiving the indication, the access control reader 108 can grant access to the physical resource at step 613, which can involve unlocking a door, enabling an elevator, opening an access gate, or other actions that can grant access to the physical resource.

The sequence diagrams of FIGS. 6-7 show examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams of FIGS. 6-7 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, computing environment 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 121, physical access application 149, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for accessing a physical resource comprising:
a client device comprising a processor and a memory; and
a physical access application executable by the client device, the physical access application causing the client device to at least:
   initiate authentication of a user account with an identity provider associated with an enterprise;
   in response to authentication of the user account, obtain a virtual badge credential on behalf of the user account;
   store the virtual badge credential in storage accessible to the physical access application;
   initiate a personal area network session with an access control reader associated with the physical resource; and
   provide an encrypted virtual badge credential generated from the virtual badge credential to the access control reader over the personal area network session, wherein the access control reader determines that access to the physical resource is granted based upon the encrypted virtual badge credential.

2. The system of claim 1, wherein the access control reader consults an access controller in communication with a physical access control server to determine that access to the physical resource is granted based upon the encrypted virtual badge credential.

3. The system of claim 1, wherein the physical access application encrypts the virtual badge credential using a public key corresponding to a private key utilized by the access control reader to decrypt the encrypted virtual badge credential.

4. The system of claim 1, wherein the physical access controller caches the virtual badge credential corresponding to the user account.

5. The system of claim 1, wherein the virtual badge credential is generated on behalf of the user account by a third party system corresponding to a vendor of the access control reader.

6. The system of claim 1, wherein the physical access application displays a visual credential on a display of the client device in response to initiating the personal area network session with the access control reader, the visual credential comprising at least one of a barcode in which an indication of the user account is embedded or a photograph of a user corresponding to the user account.

7. The system of claim 1, wherein the client device is enrolled with a management service as a managed device, and a physical access control server is configured to determine whether the client device complies with at least one compliance policy as a condition of providing access to the physical resource.

8. A method comprising:
   initiating authentication of a user account with an identity provider associated with an enterprise;
   in response to authentication of the user account, obtaining a virtual badge credential on behalf of the user account;
   storing the virtual badge credential in storage accessible to a physical access application on a client device;
   initiating a personal area network session with an access control reader associated with a physical resource; and
   providing an encrypted virtual badge credential generated from the virtual badge credential to the access control reader over the personal area network session, wherein the access control reader determines that access to the physical resource is granted based upon the encrypted virtual badge credential.

9. The method of claim 8, wherein the access control reader consults an access controller in communication with a physical access control server to determine that access to the physical resource is granted based upon the encrypted virtual badge credential.

10. The method of claim 8, wherein the physical access application encrypts the virtual badge credential using a public key corresponding to a private key utilized by the access control reader to decrypt the encrypted virtual badge credential.

11. The method of claim 8, wherein the physical access controller caches the virtual badge credential corresponding to the user account.

12. The method of claim 8, wherein the virtual badge credential is generated on behalf of the user account by a third party system corresponding to a vendor of the access control reader.

13. The method of claim 8, wherein the physical access application displays a visual credential on a display of a client device in response to initiating the personal area network session with the access control reader, the visual credential comprising at least one of a barcode in which an indication of the user account is embedded or a photograph of a user corresponding to the user account.

14. The method of claim 8, wherein a client device presenting the virtual badge credential is enrolled with a management service as a managed device, and a physical access control server is configured to determine whether the client device complies with at least one compliance policy as a condition of providing access to the physical resource.

15. A non-transitory computer-readable medium comprising machine-readable instructions, wherein when executed by a processor of at least one computing device, the machine-readable instructions cause the at least one computing device to at least:
   initiate authentication of a user account with an identity provider associated with an enterprise;
   in response to authentication of the user account, obtain a virtual badge credential on behalf of the user account;
   store the virtual badge credential in storage accessible to a physical access application executed by the at least one computing device;
   initiate a personal area network session with an access control reader associated with a physical resource; and
   provide an encrypted virtual badge credential generated from the virtual badge credential to the access control reader over the personal area network session, wherein the access control reader determines that access to the physical resource is granted based upon the encrypted virtual badge credential.

16. The non-transitory computer-readable medium of claim 15, wherein the access control reader consults an access controller in communication with a physical access control server to determine that access to the physical resource is granted based upon the encrypted virtual badge credential.

17. The non-transitory computer-readable medium of claim 15, wherein the physical access application encrypts the virtual badge credential using a public key corresponding to a private key utilized by the access control reader to decrypt the encrypted virtual badge credential.

18. The non-transitory computer-readable medium of claim 15, wherein the physical access controller caches the virtual badge credential corresponding to the user account.

19. The non-transitory computer-readable medium of claim 15, wherein the virtual badge credential is generated on behalf of the user account by a third party system corresponding to a vendor of the access control reader.

20. The non-transitory computer-readable medium of claim 15, wherein the physical access application displays a visual credential on a display of the at least one computing device in response to initiating the personal area network session with the access control reader, the visual credential comprising at least one of a barcode in which an indication of the user account is embedded or a photograph of a user corresponding to the user account.

* * * * *